(12) United States Patent
Miller et al.

(10) Patent No.: US 6,694,057 B1
(45) Date of Patent: Feb. 17, 2004

(54) METHOD AND APPARATUS FOR PROCESSING IMAGES WITH CURVES

(75) Inventors: Michael I. Miller, Jackson, NH (US); Navin Khaneja, Portsmouth College, NH (US); Muge Bakircioglu, Baltimore, MD (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 09/492,693

(22) Filed: Jan. 27, 2000

Related U.S. Application Data
(60) Provisional application No. 60/117,591, filed on Jan. 27, 1999.

(51) Int. Cl.[7] .................................................. G06K 9/46
(52) U.S. Cl. ...................... 382/203; 345/419; 345/442; 345/679; 382/128; 382/199; 382/256; 382/266
(58) Field of Search ................................ 382/128, 130, 382/131, 173, 199, 203, 256, 260, 266, 283; 600/407, 437, 500; 345/440, 419, 653, 679, 442; 378/65, 69, 901

(56) References Cited

U.S. PATENT DOCUMENTS

| | | | | |
|---|---|---|---|---|
| 4,861,419 A | * | 8/1989 | Flinchbaugh et al. | ......... 216/59 |
| 5,506,947 A | * | 4/1996 | Taubin | ........................ 345/441 |
| 5,608,855 A | * | 3/1997 | Harashima | .................. 345/442 |

(List continued on next page.)

FOREIGN PATENT DOCUMENTS

| WO | WO 97/09690 | 3/1997 |
|---|---|---|
| WO | WO 98/01818 | 1/1998 |
| WO | WO 99/24932 | 5/1999 |

OTHER PUBLICATIONS

Patent Cooperation Treaty International Search Report dated Jul. 12, 2000; International Application No. PCT/US00/01631.

Morrow, W.M. et al., "Region–Based Contrast Enhancement of Mammograms," IEEE Transactions on Medical Imaging, U.S., IEEE Inc., New York, vol. 11, No. 3, pp. 392–406, ISSN: 0278–0062 (1992).

(List continued on next page.)

*Primary Examiner*—Bhavesh M. Mehta
*Assistant Examiner*—Gregory Desire
(74) *Attorney, Agent, or Firm*—Senniger, Powers, Leavitt & Roedel

(57) ABSTRACT

A system according to the invention identifies image data points defining a curve. The method comprises the steps of determining a start point and an end point for the curve, establishing a search space that includes at least the start point, the end point, and other image data elements comprising the curve, and searching the search space using a dynamic programming algorithm to locate image data elements corresponding to the curve. Another embodiment consistent with the present invention identifies image data points defining a curve. The method comprises the steps of determining a start point and an end point for the curve, generating a model of the curve, establishing a search space that includes at least the start point, the end point, and other image data elements comprising the curve, and searching the search space using a dynamic programming algorithm and the model for the curve to locate image data elements corresponding to the curve. Yet another embodiment consistent with the present invention matches a first curve to a second curve. The method comprises the steps of identifying a first curve, identifying a second curve, generating a higher order distance measure for comparing the first curve and the second curve, and matching the first curve to the second curve using the higher order distance measure.

24 Claims, 5 Drawing Sheets

U.S. PATENT DOCUMENTS

| | | | | |
|---|---|---|---|---|
| 5,617,459 | A | * | 4/1997 | Makram-Ebeid et al. ...... 378/62 |
| 5,666,472 | A | * | 9/1997 | Huddy ........................ 345/119 |
| 5,675,720 | A | * | 10/1997 | Sato et al. ................... 345/419 |
| 5,687,737 | A | * | 11/1997 | Branham et al. ........... 600/523 |
| 5,734,739 | A | | 3/1998 | Sheehan et al. |
| 5,768,413 | A | | 6/1998 | Levin et al. |
| 5,784,431 | A | | 7/1998 | Kalend et al. |
| 5,841,958 | A | | 11/1998 | Buss et al. |
| 5,871,018 | A | * | 2/1999 | Delp et al. .................. 128/898 |
| 5,898,797 | A | | 4/1999 | Weiss et al. |
| 5,951,475 | A | * | 9/1999 | Gueziec ..................... 600/425 |
| 5,971,767 | A | * | 10/1999 | Kaufman et al. ........... 434/467 |
| 6,072,903 | A | * | 6/2000 | Maki et al. ................. 382/190 |
| 6,092,928 | A | * | 7/2000 | Mattson et al. ............. 378/205 |
| 6,106,466 | A | * | 8/2000 | Sheehan et al. ............ 600/443 |
| 6,112,112 | A | | 8/2000 | Gilhuijs et al. |
| 6,175,648 | B1 | * | 1/2001 | Ayache et al. .............. 382/154 |
| 6,175,655 | B1 | | 1/2001 | George, III et al. |
| 6,249,594 | B1 | * | 6/2001 | Hibbard ...................... 382/128 |
| 6,278,457 | B1 | * | 8/2001 | Bernardini et al. ......... 345/420 |
| 6,300,958 | B1 | * | 10/2001 | Mallet ........................ 345/442 |
| 6,366,800 | B1 | * | 4/2002 | Vining et al. ............... 600/425 |
| 6,393,159 | B1 | * | 5/2002 | Prasad et al. ............... 382/259 |

OTHER PUBLICATIONS

Revol, C.,et al. "A New Minimum Variance Region Growing Algorithm for Image Segmentation," Pattern Recognition Letters, NL, North–Holland Publ. Amsterdam, vol. 18, pp. 249–258, ISSN: 0167–8655 (1997).

Perry, A.., et al., "Segmentation of Non–Random Textures Using Zero–Crossings," Proceedings of the International Conference on Systems, Man And Cybernetics, US, New York, IEEE, pp. 1051–1054, (1989).

Bird, W.F., et al., "Towards Automated Brachytherapy Film Implant Labeling Using Statistical Pattern Recognition," Proceedings of the Symposium on Computer–Based Medical Systems, US, Los Alamitos, IEEE Coomp. Soc. Press, vol. Symp. 7, pp. 146–151, ISBN: 0–8186–6257–3 (1994).

Bajcsy, R. et al., "Multiresolution Elastic Matching," Computer Vision Graphics and Image Processing, U.S., Academic Press, Duluth, MA, vol. 46, No. 1, pp 1–21, (1989).

Sorlie, C., et al., "Matching of Digitised Brain Atlas to Magnetic Resonance Images," Medical and Biological Engineering and Computer, GB, Peter Peregrinus Ltd., vol. 35, No. 3, pp. 239–245, ISSN: 0140–0118, (1997).

* cited by examiner

METHOD AND APPARATUS FOR PROCESSING IMAGES WITH CURVES

RELATED APPLICATION

This patent application claims priority to U.S. provisional patent application No. 60/117,591 filed Jan. 27, 1999, which is herein incorporated by reference in its entirety.

GOVERNMENT RIGHTS

This work was supported in part by the following U.S. Government grants: NIH grant 50567; NSF grant BIR 9424264; and NSF grant R01 NS35368-02. The U.S. Government may have certain rights in the invention.

BACKGROUND OF THE INVENTION

The present invention relates to image processing systems and methods, and more particularly to image processing systems that process images with curves. Curves in an image provide information regarding underlying structures in the image. Curves that are apparent in brain images, for example, provide physicians with useful landmarks that can be used for treating patients. Pronounced gross morphological features of the cerebral hemisphere in mammals are known to manifest a diverse and complex arrangement of the sulcal fissures visible throughout the cortical surface of a mammalian brain. Some atlases of human anatomy catalog curved features comprising major sulci and gyri in images.

Computational metrics defined by cortical geometry such as geodesic length has attracted the attention of the neuroscience community. These special types of curved structures in the anatomy provide information for studying, among other things, the role of wiring length in the general layout of the nervous system. Despite their anatomic and functional significance curves in anatomical images such as the gyri, sulci, and many stable cortical pathways consistently appearing in the images often exhibit pronounced variability in size and configuration.

Conventional approaches for locating and characterizing curves in images are lacking because of limitations such as computational inefficiency, noise sensitivity, and an inability to accurately model curves of interest in images. There is, therefore, a need for an image processing system that overcomes the limitations of the conventional techniques.

SUMMARY OF THE INVENTION

The present invention provides a methodology for processing images with curves. Additional features and advantages of the invention will be set forth in the description which follows, and in part, will be apparent from the description, or may be learned by practicing the invention. The objectives and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, a system according to the invention identifies image data points defining a curve. The method comprises the steps of determining a start point and an end point for the curve, establishing a search space that includes at least the start point, the end point, and other image data elements comprising the curve, and searching the search space using a dynamic programming algorithm to locate image data elements corresponding to the curve.

Another embodiment consistent with the present invention identifies image data points defining a curve. The method comprises the steps of determining a start point and an end point for the curve, generating a model of the curve, establishing a search space that includes at least the start point, the end point, and other image data elements comprising the curve, and searching the search space using a dynamic programming algorithm and the model for the curve to locate image data elements corresponding to the curve.

Yet another embodiment consistent with the present invention matches a first curve to a second curve. The method comprises the steps of identifying a first curve, identifying a second curve, generating a higher order distance measure for comparing the first curve and the second curve, and matching the first curve to the second curve using the higher order distance measure.

Both the foregoing general description and the following detailed description are exemplary and explanatory and are intended to provide further explanation of the invention as claimed.

DESCRIPTION OF THE FIGURES

The accompanying drawings, which are incorporated in and constitute part of the specification, illustrate a presently preferred embodiment of the invention and together with the general description given above and detailed description of the preferred embodiment given below, serve to explain the principles of the invention.

DETAILED DESCRIPTION OF THE INVENTION

Figure 1:
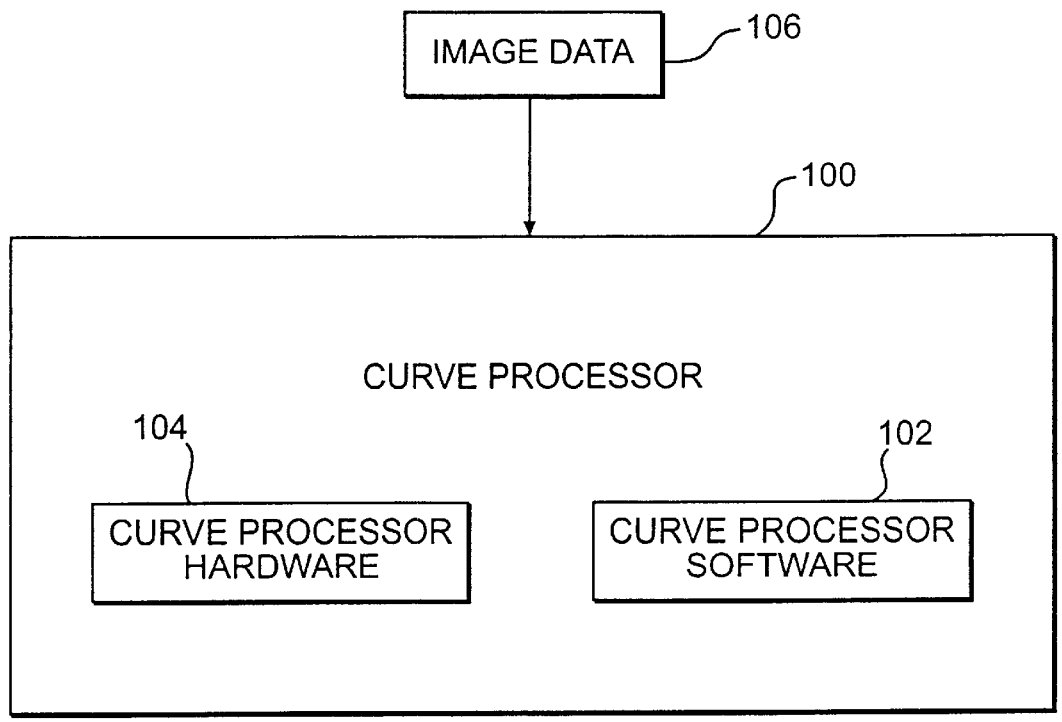
FIG. 1 is an embodiment of an apparatus for processing curves in images consistent with the present invention.

A system is disclosed which locates and matches curves in an image. FIG. 1 is an embodiment of an apparatus for processing curves in images consistent with the present invention. Curve processor 100 includes curve processor software 102 and curve processor hardware 104. Curve processor 100 receives image data 106 for processing. Image data 106 is, for example, any image that contains image data elements, at least some of which represent curved structural features. This would include medical images (e.g., computed tomography and magnetic resonance images) of the brain and other anatomical structures. Curve processor hardware 104 includes at least one hardware processing element suitable for processing image data. Curve processor software 102 is computer program code for processing image data 106 using curve processor hardware 104. The image processing operations described in greater detail below are performed by curve processor software 102 and/or curve processor hardware 104.

One skilled in the art will recognize that a parallel computer platform having multiple processors is also a suitable hardware platform for the present invention, including, but not limited to, parallel machines and workstations with multiple processors. Curve processor 100 can be a single computer, or several computers can be connected through a communications network to create a logical curve processor with the operations of curve processor software 102 and curve processor hardware 104 distributed across the computers. The functions performed by curve processor 100 can also be executed by hardware and/or software associated with medical devices such as, for example, a surgical navigation device. Moreover, the computational operations described herein can be performed by a general purpose computer, or other computational devices in a standalone configuration or with the operations distributed among several devices in a distributed network, including, but not limited to, networks linked by the Internet. In an embodiment consistent with the present invention, curve processor 100 includes a user interface for operator input (not shown).

Figure 2:
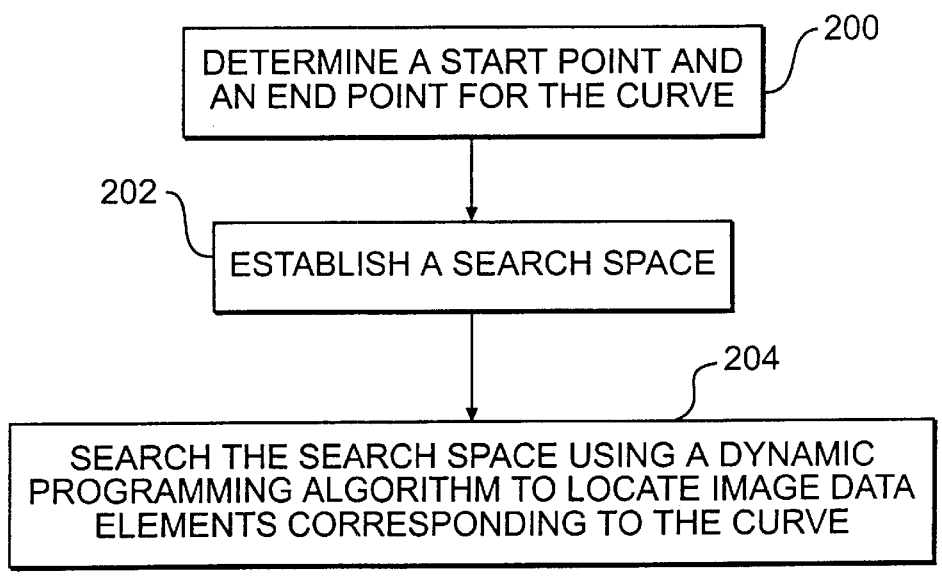
FIG. 2 is a flow diagram for identifying a target curve in image data consistent with the present invention.

In an embodiment consistent with the present invention, curve processor 100 identifies curves in image data 106. Geodesics are one example of the type of curves that can appear in image data 106. Two important neocortical curves are length minimizing geodesic curves and the curves determined by the sulcal fissures. For identifying these types of curves, dynamic programming is adapted for optimization on triangulated surfaces. FIG. 2 is a flow diagram for identifying a target curve in image data 106. To identify the points in an image comprising a geodesic, two image data elements are identified corresponding to the start point, s, and the end point, t, of the curve (step 200). Points s and t can be identified manually by an operator using a user interface to curve processor 100. Alternatively, points s and t can be identified using image processing algorithms, such as filters and edge detection routines known in the art. Once s and t are defined, there are many possible paths through the image data to connect s and t, therefore, initially there are many possible paths in the image data that are candidates for the curve being identified by curve processor 100. These many possible paths comprise a search space (step 202). An embodiment consistent with the present invention uses dynamic programming to efficiently determine which of the many possible paths through the image data corresponds to a geodesic (step 204).

In an embodiment of the dynamic programming approach, curve processor 200 generates a twice-differentiable representation of the neocortical surface at the interface of gray and white matter supporting tangent, curvature, and torsion calculations. A cortical surface M is constructed from a triangulated graph placed at the interface of the white and gray matter neocortex. For each point p∈M, the surface is preferably expressed as the graph of the function z(x, y)=f(x, y), such that it is locally quadratically approximated by $f(p)=f_x(p)=f_y(p)=0$, with $$f(x, y) = \frac{1}{2}(f_{xx}x^2 = 2f_{xy}xy + f_{yy}y^2),$$

with the 2×2 shape operator defined via the curvatures as $$\begin{pmatrix} f_{xx} & f_{xy} \\ f_{xy} & f_{yy} \end{pmatrix}.$$

The maximum and minimum eigenvalues $\kappa_1$, $\kappa_2$ are the principal curvatures of M at p, with the unit vector directions $t_1$ and $t_2$ in which these extreme values occur called the principal directions. For example, the surface created consists of 15,000 triangles, with each neighborhood of size 8–12 neighbors.

One set of curved anatomical features suitable for identification by curve processor 100 are the deepest paths in the valleys of the sulci are called the fundus beds. Fundus beds resemble crest lines corresponding to points where the maximal absolute principal curvature has a local maximum. Crest lines and curves are the loci of points x∈M where the maximal absolute principal curvature $\kappa_{max}(x)$ has a local maximum, expressed mathematically as $\nabla \kappa_{max}(x) \cdot t_m(x)=0$ for $t_m$ the principal unit direction corresponding to the maximal principal curvature.

To find image data elements corresponding to curves in a way that reduces sensitivity to noise in an image, the problem of tracking such curves is posed as a control/optimization problem. Following the dynamic programming approach, curve processor 100 searches for curves that pass through regions of curvature joining the start and end points (s, t) in the surface. For noise immunity, curve processor 100 preferably uses a sequentially additive energy associated with candidate curves and uses dynamic programming for its minimization. To apply dynamic programming, a cost function such as $\int \alpha_{(s, t)}(\kappa_{max}(x)-K)^2 dx$, with K preferably assigned the largest maximal curvature on the surface, and minimize over all such paths on the triangulated graph representation of the surface. In images of the human anatomy using this cost function in conjunction with dynamic programming generates curves that agree with those generated by an anatomist attempting to outline similar anatomical structures.

Using dynamic programming, curve processor 100 transforms image data 106 into a search space, a finite state space S of size ||S||=N and a graph representing the possible transitions between states. Curve processor 100 preferably computes the shortest paths between the specified initial states s and the final state t. For example, when the optimal path has no more than K nodes, the total number of paths of length K between points s and t are of the order $N^K$. If the cost is additive over the length of the path, dynamic programming reduces the complexity of the search algorithm to order of $KN^2$. Using $c^k(x_k, x_{k+1})$ to denote the cost incurred for the transition from state $x_k \in S$ to $x_{k+1} \in S$ at each time k, curve processor 100 selects the path π which minimizes the expected cost $$J^\pi(x_0) = \sum_{k=0}^{k=N-1} c^k(x_k, x_{k-1}),$$

with the path π identified with the sequence of arcs (s=$j_1,j_2$), ($j_2,j_3$,), . . . , ($J_{N-1}, J_N$=t), from the initial node s of the path to the terminal node t. In an embodiment consistent with the present invention, suppression of k dependence in c(i, j) means the cost is independent of time. The graph is constructed to that it preferably has no negative arc lengths, so that c(i, j) >0, and arcs of infinite cost c(i, j)=∞ signifies that there is no arc from node i to node j. An optimal path need not have more than N arcs (number of nodes in the graph) and hence takes no more than N moves. Curve processor 100 seeks to find the optimal path through the search space in N moves. Degenerate moves from a node i to itself with cost c(i, i)=0 are also permitted. The degenerate moves signify that the length of the path may be less than N. Thus, denoting the optimal cost of getting from node i to node t in (N−i) moves as $J_k(i)$, i∈S, k=0, 1, . . . , N−1, then the optimal N-length path $J_0(i)$ from i to t is given by the final step of the following algorithm, with $J_{N-1}(i)=c^{N-1}(i, t)$, and $J_k(t)$= $\min_j=1 \ldots N \{c^k(i, j)+J_{k+1}(j)\}$, k=0,1, . . . , N−2, i∈S.

Therefore, following a dynamic programming approach consistent with the present invention, curve processor 100 generates a triangulated graph from image data 106 corresponding to a brain surface. The curve start and end points, s and t, are nodes in the triangulated graph. The triangulated graph is used to reduce the search space operated on by the dynamic programming algorithm to operate on the image data elements that represent the most likely components of the geodesic. This approach allows for more efficient curve identification.

The steps of the dynamic programming curve identification method for curve identification consistent with the present invention are now set forth in greater detail when applied to locating image curves corresponding to geodesics. Geodesics on the continuum surface correspond to length minimizing curves restricted to the surface. The triangulated graph M discussed above is adapted to have indices i, j, the index nodes in the graph, and $x_y, x_j, \in R^3$ in their positions in $R^3$. Accordingly, given a two-dimensional triangulation $\{x_j \in M\}$, a platelet $P_i$ of point $x_i$ is the set of triangles (with index triples $(j_1, j_2, j_3)$ specifying their vertices) sharing $x_i$ as a common vertex $$P_i = \cup \{(j_1, j_2, j_3) | x_i = x_{j_1} \text{ or } x_i = x_{j_2} \text{ or } x_i = x_{j_3}\}.$$

A path $\alpha$ with length $L(\alpha)$ on the triangulated surface M is sequence of arcs $(j_1, j_2), (j_2, j_3), \ldots, (j_{k-1}, j_k), \ldots, (j_{N-1}, j_N)$ such that $j_k \in P_{j_{k-1}}, \forall k$, with $$L(\alpha) = \sum_{k=1}^{k=N-1} d(j_k, j_{k'1})$$

where $$d(i, j) = \sqrt{(x_i^1 - x_j^1)^2 + (x_i^2 - x_j^2)^2 + (x_i^3 - x_j^3)^2}.$$

For s and t, nodes on the triangulated surface M, consider the collection of all paths $\alpha(s, t) \subset P_{s,t}(M)$ connecting (s, t), and define the discrete geodesic $$\hat{\alpha}(s, t) = \left\{ \alpha \in P_{s,t}(M) \mid L(\alpha) = \min_{\beta \in P_{s,t}(M)} L(\beta) \right\}.$$

Given a curve passing through some point on the graph, the curve passes through one of its neighbors (analogous to being in the tangent space for the continuum representation). This structure of the triangulated graph allows for the pruning of the state space at each discrete time thereby reducing the complexity of the algorithm. Instead of searching over the whole state space S at time k, curve processor 100 examines the restricted state space $S_k \subset S$ of points in the platelet which terminates at point t in at most N−k moves. Accordingly, the state spaces and costs functions are preferably represented as follows:

$S_{N-1} = \{i | i \in P_t\}, S_k = \{i | i \in P_j, j \in S_{k+1}\}, c^k(i,j) = d(i,j), j \in P_i$ with $c^k(i,j) = \infty$ for $j \notin P_i$, with $J_{N-1}(i) = c^{N-1}(i, t), i \in S_{N-1}$, $L_k(i) = \min_{j \in \{S_{k+1} \cap P_i\}} \{c^k(i, j) + J_{k+1}(j)\}, i \in S_k,$ $k = 0, 1, \ldots, N-2$.

Then the following Algorithm 1 with $J_0(s)$ defined in the algorithm produces a shortest path (but not necessarily a unique path) between nodes s and t with length given by $J_0(s)$:

$$\hat{\alpha} = \underset{\alpha(s,t) \in P_{s,t}(M)}{\arg\min} L(\alpha)$$

ALGORITHM 1. Initialize: $J_k(i) \leftarrow \infty i \neq t$, for all k, $S_N \leftarrow t$, $J_k(t) \leftarrow 0$;

for k←N−1 down to 0 do $S_k \leftarrow \{i | i \in P_1, j \in S_{k+1}\}$, set $c^k(i,j), j \in S_{k+1}, i \in S_k$.

$J_k(i) = \min_{j \in \{S_{k+1} \cap P_i\}} \{c^k(i, j) + J_{k+1}(j)\}, i \in S_k$.

The above Algorithm 1 produces the shortest curve between points on the triangulated graph M. Since the curve is constrained to the lattice points of the graph, the computed shortest path may be different from the true geodesic. For dealing with this issue, the search for the shortest path is extended to the edges of the triangles by dividing the edges of the triangle into equal parts. To each original site $x_i$, assign as its neighbors all the sites which sit on the edges opposite to $x_i$ in triangles which have $x_i$ as a vertex. To the new set of sites which belong to the triangle edges, assign as neighbors, all sites lying on the four opposite edges to that edge thus creating new neighborhoods for each point. As refinement increases, the discrete geodesic $\hat{\alpha}$ approximates the true geodesic a arbitrarily closely.

Figure 3:
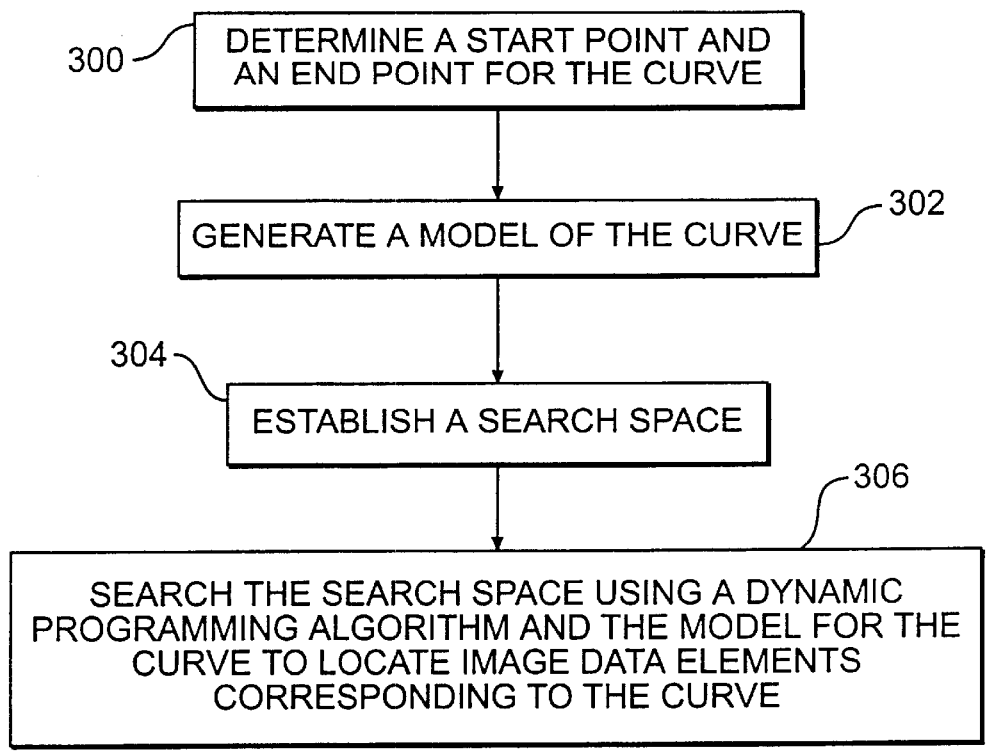
FIG. 3 is a flow diagram for identifying a target curve in image data using a curve model consistent with the present invention.

Another method consistent with the present invention identifies and tracks curves in image data 106 using dynamic programming and a curve model (FIG. 3). As described above, a start point and an end point for the target curve is determined (step 300). Curve processor 100 generates a model of the geometry of the curve being tracked (step 302). Curve processor 100 establishes a search space that includes the start point, the end point, and other image data elements comprising the target curve (step 304). Curve processor 100 uses the curve model to focus the search performed by the dynamic programming algorithm in the search space (306).

One model consistent with the present invention for curve tracking is a Frenet representation model. A Frenet curve representation models a curve's speed, torsion, and curvature. For each curve x(s) parametized by arc length s, curve processor 100 associates the orthonormal tangent field T, the normal field N, and the binormal field B. Using the Frenet representation, if $x(^+)$ is a unit speed curve with curvature and torsion fields 78, τ then T'(s)=κN(s), N'(s)=−κT(s)+τB(s), B'(s)=−τN(s), with curvature $$K(s) = \sqrt{\left[\frac{d^2 x_1(s)}{ds^2}\right]^2 + \left[\frac{d^2 x_2(s)}{ds^2}\right]^2 + \left[\frac{d^2 x_3(s)}{ds^2}\right]^2},$$

and torsion $$\tau(s) = \frac{1}{\kappa^2(s)} \det \begin{pmatrix} \frac{dx_1(s)}{ds} & \frac{dx_2(s)}{ds} & \frac{dx_3(s)}{ds} \\ \frac{d^2 x_1(s)}{ds^2} & \frac{d^2 x_2(s)}{ds^2} & \frac{d^2 x_3(s)}{ds^2} \\ \frac{d^3 x_1(s)}{ds^3} & \frac{d^3 x_2(s)}{ds^3} & \frac{d^3 x_3(s)}{ds^3} \end{pmatrix}.$$

For the prior distribution, curve processor 100 associates the potential energy with the mean lengths, curvatures, and torsions $\bar{1}$, $\bar{K}$, $\bar{t}$ with the N-length paths assuming the simplest model of constant inverse variabilities η, β, γ across the entire fundus:

$$U(l, \kappa, \tau) = \eta \sum_{k=1}^{N} (l_k - \bar{l}_k)^2 + \beta \sum_{k=1}^{N} (\kappa_k - \bar{\kappa}_k)^2 + \gamma \sum_{k=1}^{N} (\tau_k - \bar{\tau}_k)^2.$$

Parameters for the curve model can be estimated using example images by fitting polynomic splines to the surface nodes from which speeds, curvatures, and torsions are calculated. Empirical estimates of the mean lengths, curvature and torsion functions of the fundus beds can be computed from images according to the formulas:

$$\hat{\bar{l}} = \frac{1}{M} \sum_{m=1}^{M} l_k^m, \hat{\bar{\kappa}}_k = \frac{1}{M} \sum_{m=1}^{M} \kappa_k^m, \hat{\bar{\tau}}_k = \frac{1}{M} \sum_{m=1}^{M} \tau_k^m$$

$$\hat{\eta}^{-1} = \frac{1}{MN} \sum_{m=1}^{M} \sum_{k=1}^{N} (l_k^m - \hat{\bar{l}}_k)^2, \hat{\beta}^{-1} = \frac{1}{MN} \sum_{m=1}^{M} \sum_{k=1}^{N} (\kappa_k^m - \hat{\bar{\kappa}}_k)^2$$

$$\hat{\gamma}^{-1} = \frac{1}{MN} \sum_{m=1}^{M} \sum_{k=1}^{N} (\tau_k^m - \hat{\bar{\tau}}_k)^2.$$

To synthesize the fundus curves, the random process $\{l_k, \kappa_k, \tau_k, k=1, \ldots, N\}$ is preferably generated to be Gaussian, with the discretized Frenet equations solved sequentially. Suitable translation and rotation is chosen to match the start points of the curve removing ambiguity of the special Euclidean group. One skilled in the art will recognize that there are several other models for representing curves within the scope of the present invention.

After modeling the curve to be tracked, the curve model is incorporated into the dynamic programming algorithm. The dynamic programming algorithm and curve model are integrated preferably according to the following approach. The cost of a candidate curve $\alpha(s, t) \in P(s, t)$ is defined as $\int \alpha(s,t) (\kappa_{max}(x) - \kappa)^2 dx$, with κ assigned the largest maximal curvature of the surface. For finding gyral crowns, use the extrema of negative curvatures. For a surface symmetrical about a crest line, i.e., one where $t_m$ is perpendicular to the crest line, minimizing the above function gives $(\kappa_{max}(x) - \kappa) \nabla \kappa_{max} \cdot t_m = 0$ implying $\nabla \kappa_{max} \cdot t_m = 0$, which is precisely the equation for the crest line. For regions of the sulcus where the basin is flat, $\kappa_{max}$ is constant, and the minimizer of the above functional produces shortest paths through these regions.

Curve processor 100 incorporates the prior shape of fundi into the dynamic programming algorithm by associating with a candidate path $\alpha(s, t) \in M$ the set of node positions with principal maximal curvatures of the surface through which the path traverses on the surface as $(x_k, \kappa_{max}(x_k))$, $k=1, \ldots, N$, and the sequence of lengths, curvatures, and torsions $(l_k, \kappa_k, \tau_k)$, $k=1, \ldots, N$ of the curve. Using Bayes law, the posterior potential of a discrete path $\alpha(s, t)$ through the triangulated graph connecting (s, t) becomes $$H(\alpha) = \eta \sum_{k=1}^{N} (l_k - \bar{l}_k)^2 + \beta \sum_{k=1}^{N} (\kappa_k - \bar{\kappa}_k)^2 + \gamma \sum_{k=1}^{N} (\tau_k - \bar{\tau}_k)^2 + \frac{1}{\sigma^2}$$

$$\sum_{k=1}^{N} \left( \frac{(\kappa_{max}(x_k) - K)^2 + (\kappa_{max}(x_{k-1}) - K)^2}{2} + \frac{(\kappa_{max}(x_k) - \kappa_{max}(x_{k+1}))^2}{6} \right) \Delta_k^{k+1},$$

where $\Delta_k^{k+1} = \|x_k - x_{k+1}\|$ and $\sigma^2$ is a weight determining the relative contribution of each term, and curve processor 100 preferably uses the corrected trapezoid rule for the integration. Dynamic programming preferably maximizes over the space of curves $\alpha(s, t) \in P_{s,t}(M)$. Therefore, given s and t the start and end point of the curves $\alpha(s, t) \in P_{s,t}(M)$, then the Algorithm 1, with the cost for transition $c^k(i, j) = \infty, j \notin P_i$ and for $j \in P_i$, $$c^k(i, j) =$$

$$\frac{1}{\sigma^2} \left( \frac{(\kappa_{max}(x_k) - K)^2 + (\kappa_{max}(x_{k-1}) - k)^2}{2} + \frac{(\kappa_{max}(x_k) - \kappa_{max}(x_{k+1}))^2}{6} \right) \Delta_k^j +$$

$$\eta(l_k - \bar{l}_k)^2 + \beta(\kappa_k - \bar{\kappa}_k)^2 + \gamma(\tau_k - \bar{\tau}_k)^2,$$

produces the maximum a posteriori estimator of H(α), $$\hat{\alpha}(s, t) = \left\{ \alpha \in P_{s,t}(M) \mid H(\alpha) = \min_{\beta \in P_{s,t}(M)} H(\beta) \right\}.$$

Another operation performed by curve processor 100 is curve matching. Curves in image data provide useful landmark for image processing applications such as image registration. In image registration, corresponding features in two or more images are correlated to provide a map that relates image data elements among the registered images. Curve matching provides a tool for generating a coarse image data correlation in the registration process by correlating corresponding curves appearing in the images to be registered.

Figure 4:
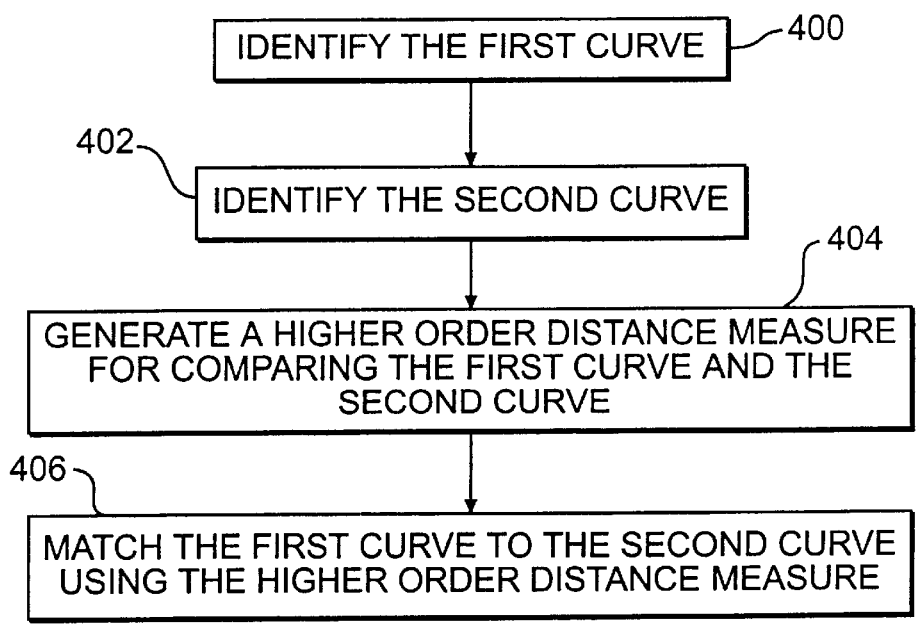
FIG. 4 is a flow diagram of a method for curve matching consistent with the present invention.

FIG. 4 is a flow diagram of a method for curve matching consistent with the present invention. Curve processor 100 identifies a first curve in a first image (step 400). Curve processor 100 identifies a second curve in a second image (step 402). Note also that the first and second curves can also be in the same image. Curve processor 100 then generates a higher order distance measure for comparing the two curves, such a distance measure using a Frenet representation of the curves (step 404). Curve processor 100 matches the first curve to the second curve using the distance measure (step 406). The foregoing steps are described in greater detail below.

Given a curve $\alpha(t)$, $t \in [0,1]$, the Frenet equations provide the differential geometric characterization of α in three dimensions (3-D) based on its speed, curvature, torsion, and the orthogonal frame (T, N, B):

$$\begin{pmatrix} \frac{dT(t)}{dt} \\ \frac{dN(t)}{dt} \\ \frac{dB(t)}{dt} \end{pmatrix} = \begin{pmatrix} 0 & vk(t) & 0 \\ -vk(t) & 0 & vk(t) \\ 0 & -vk(t) & 0 \end{pmatrix} \begin{pmatrix} T(t) \\ N(t) \\ B(t) \end{pmatrix}.$$

Here T is the unit tangent vector field, N is the unit normal vector field, B is the unit binormal field on α, and the speed, curvature, and torsion parameters are given by: $v = \|\alpha'\|$, $\kappa = \|\alpha' \times \alpha''\|/\|\alpha'\|^3$, $\tau = (\alpha' \times \alpha'') \cdot \alpha'''/\|\alpha' \times \alpha''\|$. F(t) describes the flow of the orthogonal frame through its tangent space.

Given two curves $\alpha(t)$ and $\beta(t)$ and their orthogonal frames $F_\alpha(t)$, $F_\beta(t)$ parameterized on the unit interval [0, 1], define the set of diffeomorphisms the index set [0, 1] to itself as $\Phi = [\phi:[0,1] \leftrightarrows [0,1]]$ A distance $\rho(\alpha, \beta; \phi)$ is defined using the Frobenius norm between any two 3×3 matrices A and B by: trace (A−B)(A−B)$^T$.

The distance ρ between the curves α and β is:

$$\rho(\alpha,\beta;\phi)=\int_0^1 \text{trace } (F_\alpha(t)-F_\beta(t))(F_\alpha(t)-F_\beta(t))^T dt = 2\int_0^1 (v_\alpha(t)\kappa_\alpha(t)-v_\beta(\phi(t))\kappa_\beta(\phi(t))) 2dt + 2\int_0^1 (v_\alpha(t)T_\alpha(t)-v_\beta(\phi(t))T_\beta(\phi(t)))^2 dt$$

Due to the properties of the Frenet representation, the distance ρ is inherently invariant to spatial position and orientation. The problem of matching curves across different brains is now defined as one of finding the particular diffeomorphism that minimizes the above distance.

Given two curves α(t), β(t), t∈[0, 1] and the set of diffeomorphism Φ={φ:φ(α(t))=β(t)}, curve processor 100 matches the two curves by finding the diffeomorphism that minimizes the above distance with a penalty on the velocity field:

$$\hat{\phi}(\alpha,\beta=\text{argmin}_{\phi\in\Phi}(\int_0^1\|v_\beta(\phi(t))-v_\alpha(t)\|^2 dt+\rho(\alpha,\beta;\phi)).$$

Introducing the simple norm-square function $\|v_{\beta_\phi}-v_\alpha\|^2$ in the matching provides control over local scale. For generating the lowest cost diffeomorphism, the cost function $\rho^\Delta$ is the discrete approximation to the distance. Curve processor 100 preferably uses a bipartite matching algorithm to reduce the complexity of the problem [see, e.g., Sedgewick, "Algorithms," (1983)]. Representing the curve as a linear array of straight line segments and assuming that curvature and torsion are piecewise constant, the distance assigned to the correspondence becomes:

$$\rho^\Delta(\alpha,\beta;\phi) = a\sum_j [v_\alpha(j)-v_\beta(\phi(j))]^2\Delta_j + b\sum_j [v_\alpha(j)\kappa_\alpha(j)-v_\beta(\phi(j))\kappa_\beta(\phi(j))]^2 + c\sum_j [v_\alpha(j)\tau_\alpha(j)-v_\beta(\phi(j))\tau_\beta(\phi(j))]^2\Delta_j$$

where a, b, and c are coefficients picked by an anatomist or determined by curve processor 100 to adjust the weight of the matching based on the speed, curvature, or torsion terms. Choosing to match based on speed (a≠0, b=c=0) emphasizes uniform stretching of the curves. Matching based on curvature (b≠0, a=c=0) emphasizes the turning of the curves in the plane. Matching based on torsion (c≠0, a=b=0) emphasizes twisting of the curves out of the plane. Matching based on a weighted combination of these criteria is also possible.

In the bipartite matching process implemented by curve processor 100, the target curve a is preferably sampled with n equally spaced points and the template curve β is sampled with m points (m is preferably equal to or approximately equal to N(n−1), where N is the spacing between the samples in the target). The neighborhood of each point i in the target curve is defined to be all points j∈β such that [i−j]<N. We now have a bipartite weighted graph in which there are two distinct sets of nodes (samples), and all edges in the graph connect two samples i∈α, j∈β where j is defined to be a neighbor of i. The weights on the edges are defined by:

$$w(i,j)=a[v_\alpha(i)-v_\beta(j)]^2+b[v_\alpha(i)\kappa_\alpha(i)-v_\beta(j)\kappa_\beta(j)]^2+c[v_\alpha(i)\tau_\alpha(i)-v_\beta(j)\tau_\beta(j)]^2.$$

Let i represent one of the n samples in the target. For each such sample, there is an associated cost array, where cost[i, j]=w(i, j) if the edge exists (j is in the neighborhood of i). cost[i, j]=∞ if the edge does not exist. There is also a prefer[i, k] array for each sample i in the target, which contains the indices of the template samples j sorted by their costs in ascending order. For example, if min$_j$cost[i,j]=j' then prefer [i, 1]=j', i.e., if j' is the template point (among all the template points j) for which the cost function for the target point i is minimized, then j' becomes the first point on point i's preference list. Curve processor 100 also keeps track of how far down each point in the target has progressed in its preference list. This is handled by the index[i] array, initialized to 1. The current match in the template assigned to point i is stored in the array match[i]. The algorithm proceeds as follows:

1. Initialize: index[i]=1 ∀i∈1, . . . n, match [1]=prefer [1, 1]
2. for i=2 to n do
    repeat
        isLegal=FALSE
        match[i]=prefer[i, index[i]]
        if match[i]>match[i−1]
            isLegal=TRUE
    else
        find all p and q such that
            *p≥index [i−1] and q≥index [i] where
            (p, q) ≠(match [i−1], match[i])
            *match[i]≤prefer [i−1, p], prefer [i, q]≤
            match[i−1] and
            δ$_{i-1}$(p)=cost[i−1, match[i−1]]−cost[i−1, prefer [i−1, p]
            δ$_i$(q)=cost[i, match [i]]−cost[i, prefer[i, q]])
            Δ(p, q)=δ$_{i-1}$(p)+δ$_i$(q)
            p*=argmin$_p$Δ(p, q)
            q*=argmin$_p$Δ(p, q)
            index[i−1]=p*
            index[i]=q*
            if i≠1 i=i−1
    until isLegal=TRUE.

The matching algorithm assigns each sample in the target the match with the lowest possible cost. If the match does not violate the diffeomorphism, the inner loop terminates. If it does, the matching algorithm finds the next match that does not violate the diffeomorphism for the last two points and maintains the lowest cost constraint. It then steps back to check if the new match violates the diffeomorphism for the previous points.

Figure 5:
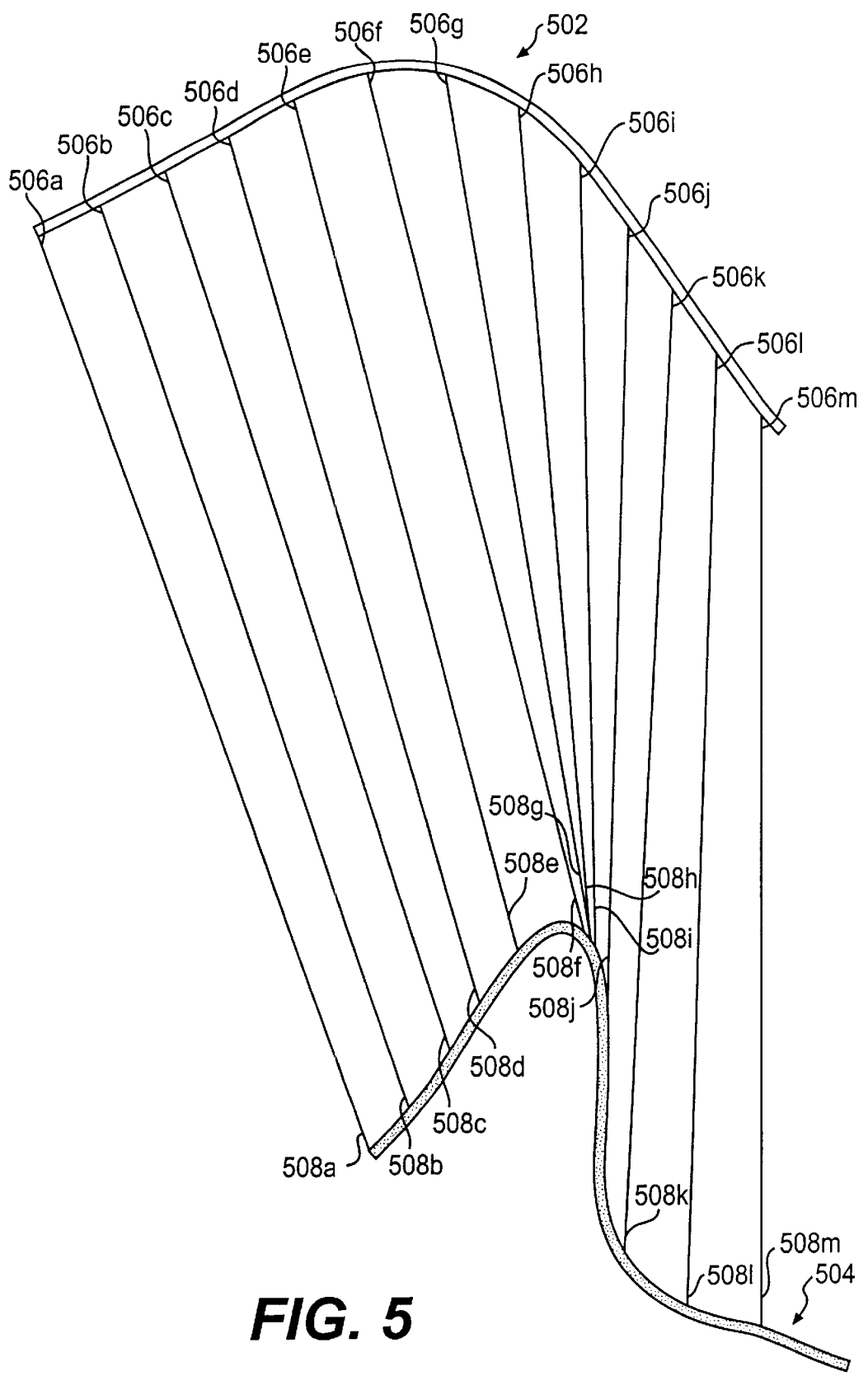
FIG. 5 is a schematic of a method for curve matching.

FIG. 5 is a schematic of a method for curve matching using only a single parameter, arc length. FIG. 5 includes two gaussian curves to be matched, target curve 502 and template curve 504. The curves have been generated with different means and standard deviations. The curves are representative of curves that appear in brain images. Template curve 504 was evaluated at points more than two standard deviations from the mean to create a relatively flat portion of the curve to the right of the peak. Target curve 502 has thirteen equally spaced ii landmark points 506*a–m*.

After executing a matching algorithm comparing the arc length between points in target curve 502 and template curve 504, points corresponding to target image 502 points 506*a–m* are shown on template curve 504 as points 508*a–m*. The limitations of using arc length alone for curve matching are apparent from the correlation of target points 506*a–m* to template points 508*a–m*. For example, some points to the left of the peak in target curve 502 are matched with points to the right of the peak in template curve 504. Also note that some points along the descending slope of target image 502 are matched to points along the flat region of template curve 504, even though target curve 502 does not have a flat region.

Figure 6:
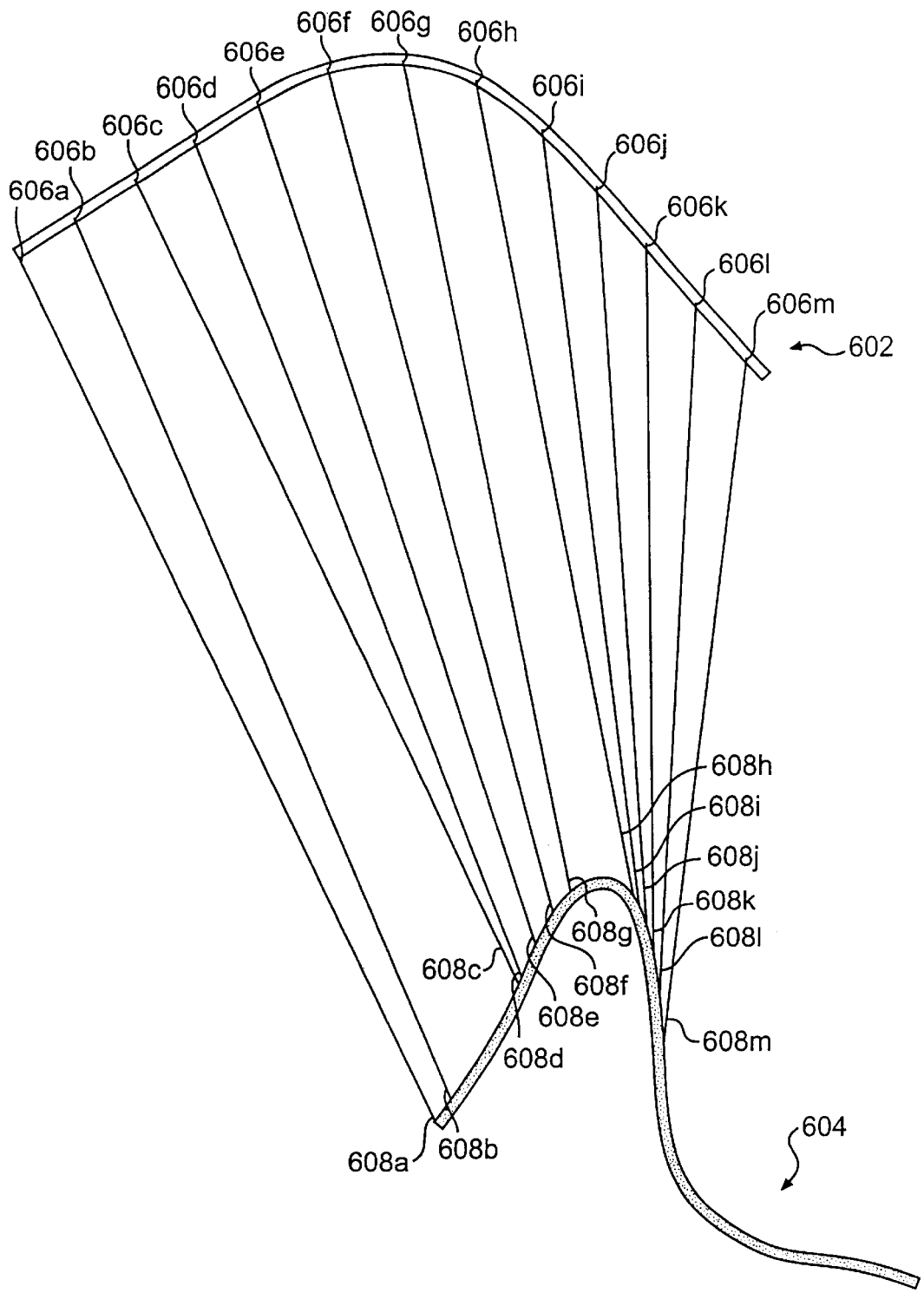
FIG. 6 is a schematic of a method for curve matching consistent with the present invention.

The limitations in the curve matching in FIG. 5 can be addressed by including higher order information in the matching algorithm. As described in greater detail above, this higher order information includes, for example, using a distance measure that includes information about a curve's curvature and torsion. FIG. 6 shows the result of applying a method for curve matching consistent with the present invention using higher order information (e.g., curvature and torsion) in the matching process.

Target curve 602 has landmark points 606a–m. Target curve 602 and template curve 604 are gaussian curves as described for FIG. 5. After applying the matching algorithm using a distance measure that includes curvature and torsion, points 608a–m in template curve 604 were matched to points 606a–m in the target curve, respectively. In contrast to the matching shown in FIG. 5, FIG. 6 shows that points matched in the target and template curves correspond to the same side of the curve peak. Also, no points in the target curve are mapped to the flat region of the template. Thus, using this higher order in the matching distance measure can improve matching.

Figure 7:
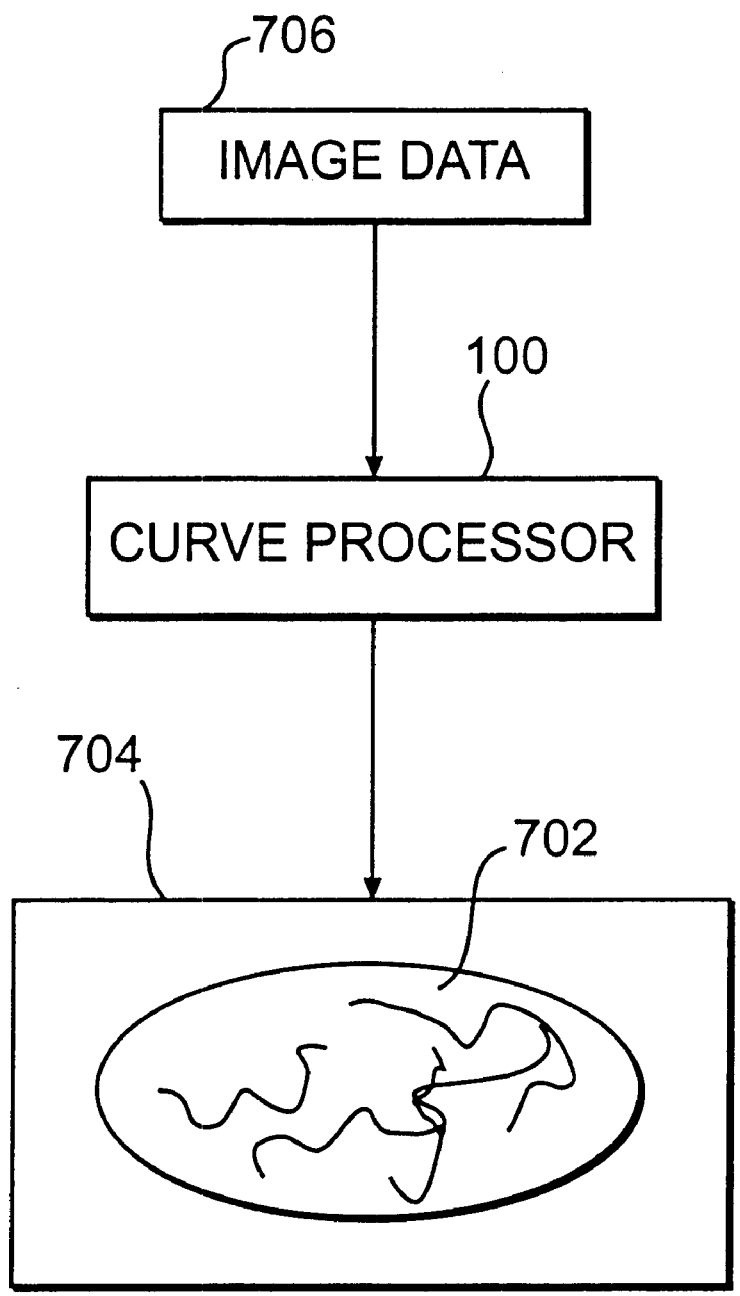
FIG. 7 is an embodiment of an apparatus for processing curves in medical images consistent with the present invention.

Locating and matching curves in image data is useful in many image processing applications including medical image processing. An embodiment consistent with the present invention generates vascular connections by generating curves in imagery of any dimension from intensity imagery such as CT-angiography or MR-angiography. Since it is based on dynamic programming it can generate a globally optimal decomposition of the solid volume into arterial pathways. FIG. 7 is a block diagram of an embodiment of a curve processor for medical images consistent with the present invention. Image data 706 is medical image data containing curve features such as CT-angiography. Since curve processor 100 can process three-dimensional imagery, by using the three dimensional geometry of the images, curve processor 100 can process data independently from the viewing orientation and is therefore not limited by the viewer. Curve processor 100 extracts curves from image data 706 and generates data 704 containing curves representing arterial pathways 702.

Another embodiment calculates a structural representation of the blood flow through a three-dimensional curve in angiographic images by calculating the local average intensity in the arterial enclosed region providing an automated diagnostic tool for measuring flow versus arc-length. Another embodiment of curve processor 100 provides a three-dimensional, real time viewing instrument of arbitrary geometry vasculature. Given the structural description of the orientation of vessels and their extent, curve processor 100 generates view of the structure by removing the obscuring effects of two-dimensional projections. Using dynamic programming curve processor 100 generates multiple arterial projections and handles bifurcations. Moreover, curve processor 100 can produce arterial flow diagrams illustrating blockage as a function of position along a structural representation. Such a description provides an analyzer for arterial blockage and ballooning such as is associated with coronary disease and arterial infarctions.

While the disclosed system and method is useful for medical imaging systems used for noninvasive exploration of human anatomy, for example, computed tomography and magnetic resonance imaging, this invention can also be used on images acquired from other imaging modalities. Furthermore, application of the present invention is not limited to anatomical images. This invention also applies to non-anatomical images, including, but not limited to, satellite imagery, photographs, radar images, and images acquired from multiple sources.

It will be apparent to those skilled in the art that various modifications and variations can be made to the disclosed embodiments of the present invention without departing from the spirit or scope of the invention. Thus it is intended that the present invention cover the modifications and variations of this invention provided they come within the scope of the appended claims and their equivalents.

We claim:

1. A method for identifying image data points defining a target curve comprising the steps of:

determining a start point and an end point for the target curve on the three-dimensional surface represented by a triangulated graph;

establishing a search space on the three-dimensional surface that includes at least the start point and the end point corresponding to the target curve, and other image data elements which may correspond to the target curve;

searching the search space using a dynamic programming algorithm to locate particular image data elements corresponding to the target curve; and identifying the target curve on the three-dimensional surface, said target curve comprising the start point, the end point and the particular image data elements.

2. The method of claim 1, wherein the step of searching the search space comprises the substep of:

locating an image data element corresponding to a curve representative of anatomical structure.

3. A method for identifying image data points defining a target curve comprising the steps of:

determining a start point and an end point for the target curve on a three-dimensional surface represented by a triangulated graph;

generating a model of the target curve;

establishing a search space on the three-dimensional surface that includes at least the start point and the end point corresponding to the target curve, and other image data elements which may correspond to the target curve;

searching the search space using a dynamic programming algorithm and the model for the target curve to locate particular image data elements corresponding to the target curve; and identifying the target curve on the three-dimensional surface, said target curve comprising the start point, the end point and the particular image data elements.

4. The method of claim 3, wherein the step of searching the search space comprises the substep of:

locating an image data element corresponding to a curve representative of anatomical structure.

5. A method for matching a first curve to a second curve comprising the steps of:

identifying the first curve in a search space on a three-dimensional surface;

identifying the second curve in a search space on a three-dimensional surface;

generating a higher order distance measure which includes curvature and torsion parameters for each of the first and second curves for comparing the first curve and the second curve; and matching the first curve to the second curve using the higher order distance measure.

6. The method of claim 5, wherein the step of matching the first curve to the second curve comprises the substep of:

matching at least one curve representative of anatomical structure.

7. The method of claim 5, wherein the step of generating a higher order distance measure comprises the substep of:

generating a distance measure including a Frenet representation of at least one of the first curve and the second curve.

8. The method of claim 5, wherein the step of matching the first curve to the second curve comprises the substep of:

executing a bipartite matching algorithm.

9. An apparatus for identifying image data points defining a target curve comprising:

means for determining a start point and an end point for the target curve on a three-dimensional surface represented by a triangulated graph;

means for establishing a search space on the three-dimensional surface that includes at least the start point and the end point corresponding to the target curve, and other image data elements which may correspond to the target curve;

means for searching the search space using a dynamic programming algorithm to locate particular image data elements corresponding to the target curve; and means for identifying the target curve on the three-dimensional surface, said target curve comprising the start point, the end point and the particular image data elements.

10. The apparatus of claim 9, wherein the means for searching the search space further comprises:

means for locating an image data element corresponding to a curve representative of anatomical structure.

11. An apparatus for identifying image data points defining a target curve comprising:

means for determining a start point and an end point for the target curve on a three-dimensional surface represented by a triangulated graph;

means for generating a model of the target curve;

means for establishing a search space on the three-dimensional surface that includes at least the start point and the end point corresponding to the target curve, and other image data elements which may correspond to the target curve;

means for searching the search space using a dynamic programming algorithm and the model for the target curve to locate particular image data elements corresponding to the target curve; and means for identifying the target curve on the three-dimensional surface, said target curve comprising the start point, the end point and the particular image data elements.

12. The apparatus of claim 11, wherein the means for searching the search space further comprises:

means for locating an image data element corresponding to a curve representative of anatomical structure.

13. An apparatus for matching a first curve to a second curve comprising:

means for identifying the first curve in a search space on a three-dimensional surface;

means for identifying the second curve in a search space on a three-dimensional surface;

means for generating a higher order distance measure which includes curvature and torsion parameters for each of the first and second curves for comparing the first curve and the second curve; and means for matching the first curve to the second curve using the higher order distance measure.

14. The apparatus of claim 13, wherein the means for matching the first curve to the second curve further comprises:

means for matching at least one curve representative of anatomical structure.

15. The apparatus of claim 13, wherein the means for generating a higher order distance measure further comprises:

means for generating a distance measure including a Frenet representation of at least one of the first curve and the second curve.

16. The apparatus of claim 13, wherein the means for matching the first curve to the second curve further comprises:

means for executing a bipartite matching algorithm.

17. An article of manufacture for identifying image data points defining a target curve comprising:

a module configured to cause a computer to determine start point and an end point for the target curve on a three-dimensional surface represented by a triangulated graph;

a module configured to cause the computer to establish a search space on the three-dimensional surface that includes at least the start point and the end point corresponding to the target curve, and other image data elements which may correspond to the target curve;

a module configured to cause the computer to search the search space using a dynamic programming algorithm to locate particular image data elements corresponding to the target curve; and a module configured to cause the computer to identify the target curve on the three-dimensional surface, said target curve comprising the start point, the end point and the particular image data elements.

18. The article of manufacture of claim 17, wherein the module configured to cause the computer to search the search space further comprises:

a module configured to cause the computer to locate an image data element corresponding to a curve representative of anatomical structure.

19. An article of manufacture for identifying three-dimensional image data points defining a target curve comprising:

a module configured to cause a computer to determine a start point and an end point for the target curve on the three-dimensional surface on a three-dimensional surface represented by a triangulated graph;

a module configured to cause the computer to generate a model of the target curve;

a module configured to cause the computer to establish a search space on the three-dimensional surface that includes at least the start point and the end point corresponding to the target curve, and other image data elements which may correspond to the target curve;

a module configured to cause the computer to search the search space using a dynamic programming algorithm and the model for the target curve to locate particular image data elements corresponding to the target curve;

a module configured to cause a computer to identify the target curve on the three-dimensional surface, said target curve comprising the start point, the end point and the particular image data elements.

20. The article of manufacture of claim 19, wherein the module configured to cause the computer to search the search space further comprises:

a module configured to cause the computer to locate an image data element corresponding to a curve representative of anatomical structure.

21. An article of manufacture for matching a first curve to a second curve comprising:

a module configured to cause a computer to identify the first curve in a search space on a three-dimensional surface;

a module configured to cause a computer to identify the second curve in a search space on a three-dimensional surface;

a module configured to cause computer to generate a higher order distance measure which includes curvature and torsion parameters for each of the first and second curves for comparing the first curve and the second curve; and a module configured to cause a computer to match the first curve to the second curve using the higher order distance measure.

22. The article of manufacture of claim 21, wherein the module configured to cause the computer to match the first curve to the second curve further comprises:

module configured to cause the computer to match at least one curve representative of anatomical structure.

23. The article of manufacture of claim 21, wherein the module configured to cause the computer to generate a higher order distance measure further comprises:

a module configured to cause the computer to generate a distance measure including a Frenet representation of at least one of the first curve and the second curve.

24. The article of manufacture of claim 21, wherein the module configured to cause the computer to match the first curve to the second curve further comprises:

a module configured to cause the computer to execute a bipartite matching algorithm.

* * * * *